Sept. 16, 1930.  A. B. DE SALARDI  1,775,892

PINLESS PISTON

Filed March 7, 1929

Inventor:
Albert Bernhard de Salardi

Patented Sept. 16, 1930

1,775,892

UNITED STATES PATENT OFFICE

ALBERT BERNHARD DE SALARDI, OF PORT ARTHUR, TEXAS

PINLESS PISTON

Application filed March 7, 1929. Serial No. 344,957.

This invention relates to piston construction for internal combustion engines, steam engines, pumps, compressors and the like, and has for its main object to provide a combined unitary piston and connecting rod construction which will be extremely simple, safe and efficient in operation and which will do away with the present connecting rod pins thereby greatly simplifying the mechanism to which it relates and doing away with such parts of the present connecting rod and piston construction where the greatest wear and most frequent breakdowns occur.

Incidentally my invention also aims and will lead to a great reduction or almost total elimination of the lateral pressures resulting from the reactions which now arise in the above mentioned machine elements.

As it is well known the piston and connecting rod mechanisms where the two elements are connected by a pin and are used in combination with a crank shaft to transform a reciprocal movement into a rotating one, or vice versa, have at present a conspicuously weak point being represented by the pin which is subject to great stress and intensive friction requiring frequent and expensive repair. Another disadvantage of the present piston connecting rod construction is that the force acting on the piston will have a different direction from that of the center line of the connecting rod, which latter is the direction of the transmission of the power, thereby causing transverse components in the forces acting, which again leads to the well known harmful intensive friction between the piston and the cylinder wall. This and other disadvantages will be eliminated by my invention, as will be apparent as the specification of the same proceeds.

In the drawings forming a part of this specification and being appended hereto:

Figure 1:
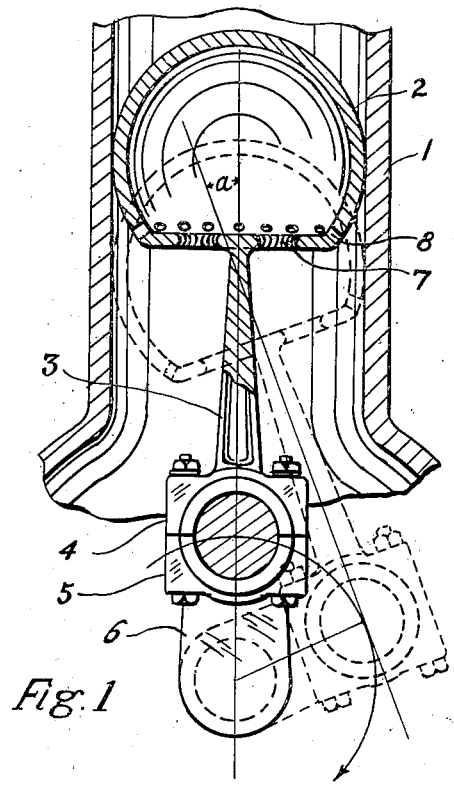
Fig. 1 is a fragmentary sectional view of a piston and connecting rod constructed according to one embodiment of my invention, with portions of the cylinder and crank shaft also being shown.

Referring now to the drawings, more closely, by characters of reference, the numeral 1 indicates a section of a cylinder in which my piston 2 is operating. The piston 2 is formed mainly of a portion of a hollow sphere and it will be obvious that during the operation thereof various parts thereof will always be in contact with the cylinder wall and will make a closure between the two parts of the cylinder, the tightness of said closure being dependent on the workmanship and relative dimensions of the cylinder and the spherical piston head. As a rule the outside diameter of the sphere of the piston will be slightly smaller than the inside diameter of the cylinder in order to allow for the necessary heat expansion by the materials used and by the temperatures created. The spherical piston 2 and the inner cylinder walls will always have a close line of contact, which will substantially be a meridian circle of the sphere, and which, with due lubrication will offer a sufficient resistance against the leakage of combustion gases, steam or air, or any other fluid medium under pressure.

The piston 2 may have a flat bottom wall from which projects connecting rod 3 which may be an integral part of the piston head construction 2, as shown in Fig. 1, but it will be understood that it may be made as a separate piece of mechanism and then secured and rigidly fastened to the spherical head. Rod 3 is rotatably secured at its other end 4 on a usual crank shaft 6, said end 4 with a lower bearing shell 5 and with the usual bolts forming the well known connecting rod bearing for the crank shaft pin.

The flat bottom of the piston sphere 2 may have larger bores 7 provided around the end of the rod 3 for the purpose of admitting a lubricant preferably thrown up by the revolving crank into the inner space of the hollow piston sphere and said hollow sphere may also have smaller bores or holes 8 adapted to distribute the lubricating material on the cylinder wall. One extreme position of the piston with its connecting rod is shown by the dotted lines and in such position the center line of the connecting rod will be tangential to the circular arrow in the lower portion of Fig. 1, indicating the line of rotation of the center of the crank shaft pin and in such position the center lines of the cylinder and of the connecting rod will form the angle "a", being the greatest angle between said two lines.

Figure 2:
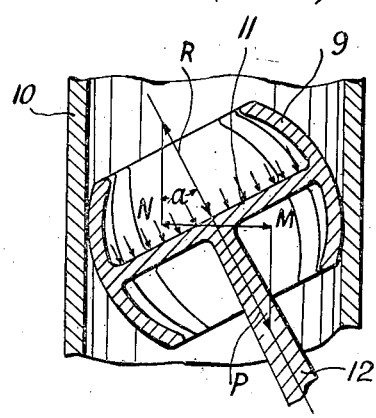
Fig. 2 is another fragmentary sectional view of the preferred modification of my piston with a portion of its connecting rod and of the cylinder in which it works.

In Fig. 2 there is shown a fragment of a cylinder 10 with a spherical piston 9 and a portion of its integral connecting rod 12. The top and bottom ends of the hollow spherical piston 9 are cut away and open in this construction and the connecting rod 12 is integral or secured to a central dividing wall 11 in said hollow sphere. The plane of the dividing wall 11 is perpendicular to the center line of the connecting rod 12 so that the pressure of the working medium in the cylinder 10 will exert forces perpendicular to the dividing wall 11 and always in the direction of the center line of the connecting rod 12 as indicated by the small arrows towards said wall 11. The resultant of these forces is indicated by the letter "P" and by the arrow to which it points, while the reaction in the connecting rod caused by the same is indicated by the letter "R", the two being in the same lines, but in opposite directions, while their transverse components "M" and "N" pointing towards and being perpendicular with the cylinder wall always being equal and also opposite in direction, so that one such transverse component will entirely counterbalance the other one. It is obvious therefore that there will be no force or tendency to press the piston on the cylinder walls in any direction and therefore there will practically be no friction and wear and tear between the cylinder walls and the spherical piston head. The herein described condition is a theoretical and ideal one, based on the assumption that the total pressure of the working fluid will act on the dividing wall 11 only, but due to the thickness of the wall of the spherical piston the inside surface of the dividing wall 11 is somewhat smaller than the area of the bore of the cylinder and the pressure acting on the difference of these two areas will create a comparatively small component which will exert some pressure between the spherical piston and the cylinder wall. If, however, the piston is made of a suitable material with the thinnest possible wall compared to the bore of the cylinder this transversal component will be negligible and so will be the friction which it will create on the piston wall. To obtain the maximum useful area the dividing wall 11 preferably will pass through the center of the sphere of the piston.

Figure 3:
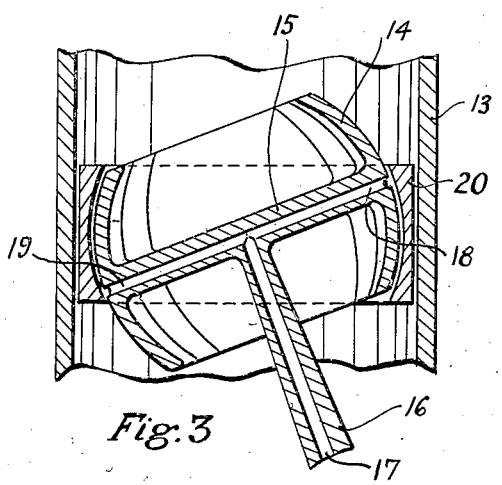
Fig. 3 is a fragmentary sectional view of another modification of my invention, the showing being similar to that of Fig. 2.

In Fig. 3 a modified form of the embodiment shown in Fig. 2 is illustrated. Piston 14 is similarly constructed to the one shown in Fig. 2 having a dividing wall 15 and the connecting rod 16 secured to or integral therewith. The outside diameter of the spherical piston 14 in this modification, however, is considerably smaller than the inside diameter of the cylinder 13 and a sleeve 20 is interposed between the two, the outside cylindrical surface of said sleeve slidingly fitting into the cylinder, while the spherical piston 14 fits into the inside spherical surface of the sleeve 20.

The operation of this as well as the earlier two embodiments of my invention will be obvious by inspecting the drawings. In this last embodiment illustrated in Fig. 3 the working fluid will exert a pressure on the dividing wall 15 of the piston as well as on the end surfaces of the sleeve 20 and the two will move together, the spherical piston describing an oscillating motion within the sleeve 20.

An oil duct 17 may be provided in the connecting rod 16 leading to transverse ducts 18 and 19 in the dividing wall 15 distributing the lubricant in the groove on the outside spherical sliding surface. The location and arrangement of these grooves may be made in such a manner that they will never be exposed to the high pressure working medium. Sleeve 20 may be made in one piece, forged or pressed over the spherical piston by suitable shop operations or it may be split and resilient like the usual piston ring having a tendency to expand. Similarly as in the case of the construction of Fig. 2, if the side thickness of the piston 14 and of the sleeve 20 is reduced the transverse component of the working forces and the friction on the cylinder wall caused by them may be kept very small.

Figure 4:
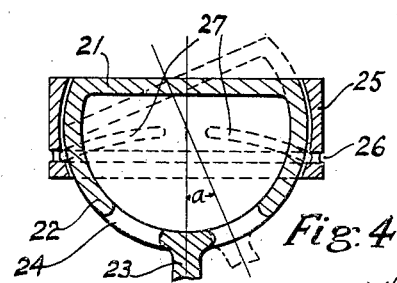
Fig. 4 is a fragmentary sectional view of still another form of a piston constructed according to my invention, with portions of its associated parts, while—

In Fig. 4 I show a still further modified form of my piston in section, with the surrounding portions of a sleeve in which it is adapted to operate. The piston has a spherical outside surface 22 and a flat outside surface 21 exposed to the working pressure. 23 indicates the connecting rod and 24 are holes or bores in the lower part of the piston to reduce its weight. The flat surface 21 is perpendicular to the center line of the connecting rod 23 in order to insure that the working pressure is directly transmitted to the connecting rod 23 without any noticeable side component. A sleeve 25 slidingly fits over the sphere 22 and may have grooves 26 in its outside surface, while grooves 27 may be provided on the inside surface of said sleeve so that lubricating materials may be interposed between the cylinder walls and the sleeve on the one side and between the sleeve and the spherical piston on the other side. The groove may again be located in such a manner that it will not be exposed to the pressure of the working medium during the usual operating movements of the parts. The position of the piston and of the connecting rod when they form the greatest outward angle "a" with the center line of the cylinder is indicated by the dotted lines. The piston head also may have grooves on its outside surface for the distribution of the lubricating materials and holes leading from its hollow inside to said grooves, these grooves and holes not being shown in the figure.

Figure 5:
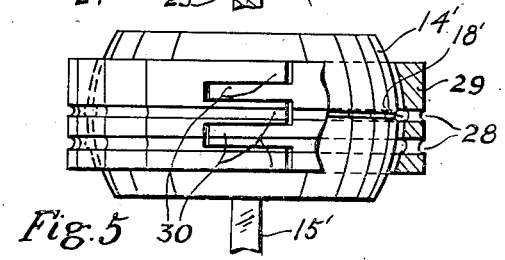
Figs. 5 and 6 are elevational views of spherical pistons with associated sliding sleeves, parts of said sleeves being in section, said figures showing further modifications of my inventive thought.

Fig. 5 is an elevational view of a piston and its sleeve constructed on similar principles to those of the mechanism in Fig. 3. Spherical piston 14' is surrounded by a sleeve 29 and a connecting rod 15' is secured thereto. The sleeve 29 is split and formed with cooperating grooves and tongues 30, while oil distributing grooves 28 may be provided in its outside surface being connected by throughgoing holes with oil grooves on the inside surface of the sleeve. Sleeve 29 may be made with a tendency for radial expansion so that it will be adapted to fill the space between the piston and the cylinder, acting in the manner of a series of effective piston rings.

Figure 6:
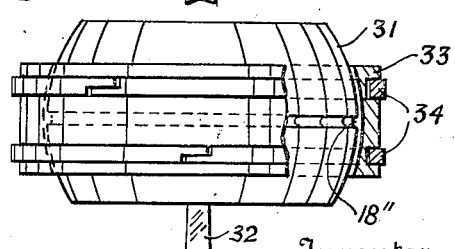

Fig. 6 is a view similar to that of Fig. 5 and shows a somewhat similar construction wherein piston 31 is similarly constructed to those of Figs. 3 and 5 and is surrounded by a sleeve 33 which may have circumferential grooves and usual piston rings 34 therein.

All the piston constructions shown in Figs. 1 to 6 may be manufactured easily and conveniently from drop forged or punched metal parts, welded or otherwise rigidly fastened together and their sliding surfaces may be highly finished and polished.

It is understood that changes and variations may be made in the various parts of my invention and I hereby reserve all my rights to such modifications as are within the spirit of the invention and the scope of the appended claims.

One such change may be made by providing several surfaces instead of the surface 11 which is perpendicular to the center line of the connecting rod 12, said surfaces being arranged in such a manner that the resultant of the pressure of the working medium on these surfaces will act in the center line of said rod.

What I claim as new, is:

1. For use with a machine having a working cylinder, a pinless piston comprising a hollow body, open at both ends, the outside surface of said hollow body being the central portion of a sphere, a partition wall inside of said hollow body going through the center of said sphere, said partition wall forming a circular working surface to receive the pressure of the working medium, a connecting rod rigidly attached to said partition wall, the centerline of said connecting rod being perpendicular to said circular working surface and going through its center, and oil ducts in said connecting rod and partition wall leading to the outside surface of the hollow body.

2. For use with a machine having a working cylinder, a pinless piston of claim 1, a sleeve encircling the hollow piston body, the inside surface of said sleeve being a spherical zone slidingly fitting around the outside surface of the hollow piston body and the outside surface of said sleeve being cylindrical, slidingly fitting into said working cylinder, said sleeve having oil distributing grooves on its outside and inside surfaces, connected by throughgoing holes.

Signed at Port Arthur, in the county of Jefferson and State of Texas, this fourth day of March, A. D. 1929.

ALBERT BERNHARD DE SALARDI.